May 19, 1936. F. O. JAQUES 2,041,346
METHOD OF MAKING AN ABRASIVE CUTTING TOOL
Filed Feb. 23, 1933 2 Sheets-Sheet 1
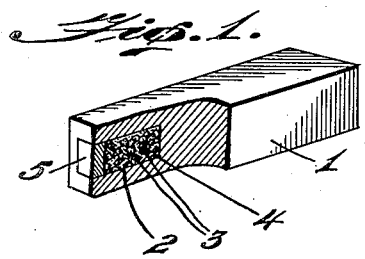
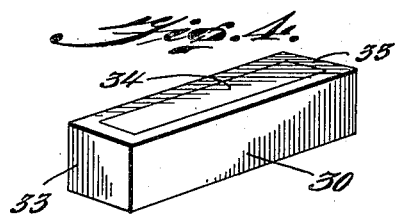
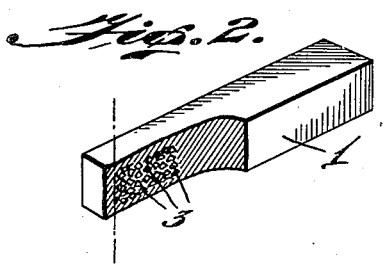
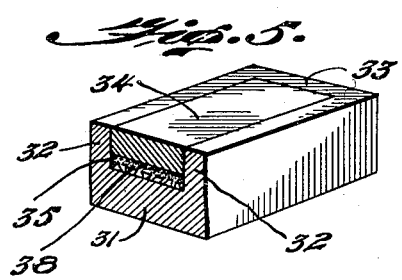
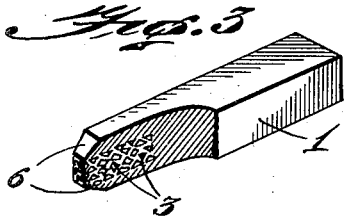
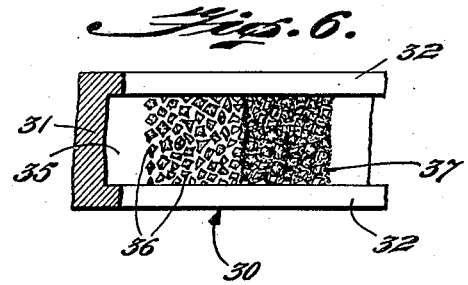
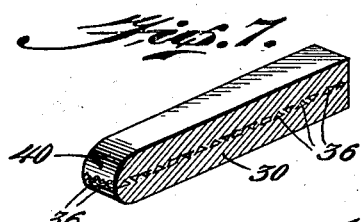
Inventor
Hernando O. Jaques
By Purley H. Plant
Attorney May 19, 1936.　　　F. O. JAQUES　　　2,041,346
METHOD OF MAKING AN ABRASIVE CUTTING TOOL
Filed Feb. 23, 1933　　　2 Sheets-Sheet 2
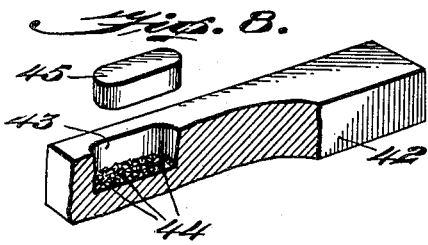
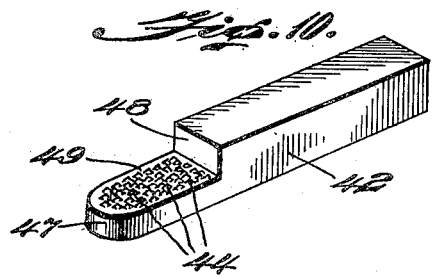
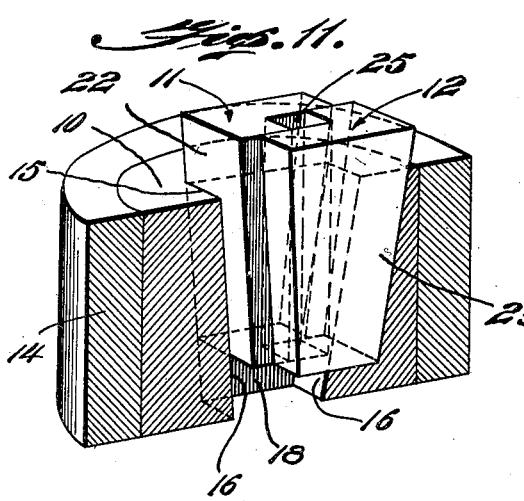
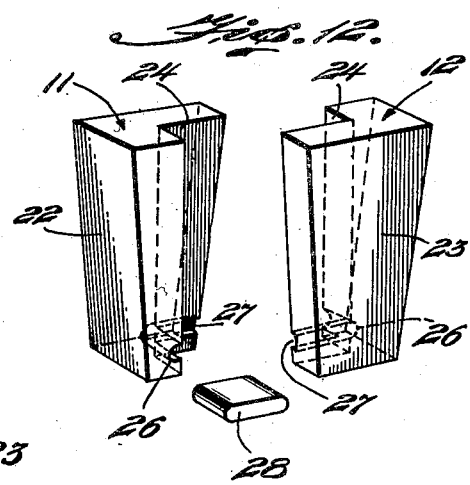
Inventor
Fernando O. Jaques
By Purley H. Plant
Attorney Patented May 19, 1936

2,041,346

UNITED STATES PATENT OFFICE 2,041,346

METHOD OF MAKING AN ABRASIVE CUTTING TOOL

Fernando Oscar Jaques, Providence, R. I., assignor of one-fourth to Louis S. Moulthrop, Cranston, R. I., and one-fourth to Shirley Harrington, Barrington, R. I.

Application February 23, 1933, Serial No. 658,088

6 Claims. (Cl. 76—101)

This invention relates to an improved diamond cutting or abrading tool and method of making the same, and in a more generic sense, comprehends a method of mounting diamonds and the like in hard metal so as to render them effective as cutting or abrading agents in wearing away hard substances.

Heretofore diamond dressing, lapping or other cutting tools have been made by one or another of the following methods:—by setting a relatively large diamond in a relatively hard metal, such as iron or steel, either directly by heating and hammering the metal about a portion of the diamond or by first enclosing the diamond in a soft metal sheath, such as copper, and securing the soft metal enclosed diamond in a relatively hard metal holder; by mixing small diamond particles with a binder material or matrix and compressing the mass to form a composite abrasive material containing diamond particles as the abrasive element; or by forcing diamond powder into the periphery of a metal holder. In forming such tools by using diamonds of relatively large size great care must be exercised in setting the diamonds to prevent them from becoming cracked or broken in setting them, and when they are enclosed in a soft metal sheath the heat developed in using the tool tends to soften the sheath metal to such an extent as to allow the stone to become loose and thus destroy its effectiveness until it is reset. Furthermore, in setting diamonds either in relatively hard or in soft metal for this purpose there is always a tendency in using the methods heretofore employed for the diamonds to work loose from the metal and thus permit destruction of the diamonds. Further, in the use of diamonds of relatively large size in forming dressing tools their cutting edges become worn and assume a rounded shape so that they fail to cut the grinding wheel but form a glaze thereon which renders the wheel inefficient for its purpose. In forming lapping tools by incorporating diamond particles in a matrix and compressing the mass, as well as in forcing diamond powder into the surface of a metal holder, the diamond particles are not firmly held in place and are readily torn out of the surrounding material by use. The present invention as applied to tools of this character differs from the articles and methods of making them, as above described, in that it involves the use preferably of a plurality of small diamonds or diamond particles, and provides for the setting or incorporation of the diamonds or diamond particles into a hard metal, such as a suitable hard-metal such as iron, steel, steel alloys and other hard metal alloys such, for example, as stellite, while the hard metal is in a relatively soft, or partially plastic condition so that the diamonds or diamond particles may be distributed substantially uniformly throughout certain areas of the metal in accordance with a prearranged plan of distribution, whereby they are so positioned as to be most effective for the use contemplated. Each separate diamond or diamond particle is set or embedded directly within the hard metal and is thus firmly held against becoming loose until the surrounding hard metal is worn away, and the provision of a plurality of small diamond particles tends always to present sharp cutting edges instead of glazing the surface of the wheel after continued use. The employment of a considerable number of small diamond particles arranged in accordance with a predetermined plan provides what may be termed a cutting area within the tool which is continually effective until the tool is entirely worn away beyond that area, and the cutting area may be given such shape as is best suited for the particular work for which the tool is intended.

One object of the invention is the provision of a tool of this character provided with a plurality of small cutting points so positioned as to be effective substantially simultaneously upon a surface to be abraded whereby an improved surface may be imparted to a grinding wheel.

Another object of the invention is the provision of an improved tool of this character provided with a cutting area of abrasive particles which may be given any desired form or arrangement whereby the abrasive particles may be made most effective for the particular purpose desired.

A further object of the invention is the provision of a diamond cutting tool having a plurality of diamonds separately embedded within the metal of a tool body in such a manner as to hold the diamonds firmly in place and prevent movement of the diamonds under working conditions.

Another object of the invention is the provision of a cutting tool of this character having a plurality of diamonds separately embedded and held within a hard metal.

A further object of the invention is to provide a method for setting one or more diamonds in a hard metal in such a manner that the diamonds may be completely embedded within the hard metal and firmly held thereby so as to prevent them from becoming loose when in use, and that without injury to the diamonds in placing them within the metal.

Another object of the invention is the provision of an improved cutting or abrading tool and method of making the same to provide a plurality of effective abrasive points each securely held within the metal of the tool body and so arranged as to provide a cutting area of a desired contour.

Other objects and advantages of the invention relate to various improved details of construction and novel arrangements of the parts as well as certain novel steps in the formation of the same as will be more fully set forth in the detailed description to follow.

Referring to the drawings:—

Fig. 1 is a perspective view, partially in section, showing a metal shape provided with an end recess containing diamonds or diamond particles mixed with comminuted metal, Fig. 2 is a similar view of the metal shape as shown in Fig. 1, illustrating the location of the diamonds after the metal bar or shape has been subjected to treatment for embedding the diamonds in the metal.

Fig. 3 is a view similar to Fig. 2, showing the cutting tool after the metal adjacent the end portion thereof has been cut away to form a diamond cutting end surface, Fig. 4 is a perspective view of another type of metal body such as may be employed in making one form of diamond dressing tool, Fig. 5 is an enlarged perspective view of the metal shape or bar shown in Fig. 4, partially in section, illustrating the position of the abrasive particles and metal material prior to forming the completed tool, Fig. 6 is an enlarged top plan view of the structure shown in Figs. 4 and 5, with the cover plate removed, and showing the manner of arranging the abrasive elements and metal filler material within the recess.

Fig. 7 is a perspective sectional view of a completed tool as formed from the bar structure shown in Figs. 4 to 6, inclusive, and illustrating one position and arrangement which the abrasive elements may assume in the completed tool, Fig. 8 is a perspective view, partially in section, of another form of bar structure or metal shape such as may be employed in making an abrading or cutting tool, Fig. 9 is a transverse sectional view through a completed tool, such as may be made after the manner shown in Figs. 4 to 6 or in Fig. 8 of the drawings, illustrating the position and arrangement of the diamonds or abrasive elements in the tool body, Fig. 10 is a perspective view of one form of completed tool such as may be formed by the methods shown in Figs. 4 to 6 or in Fig. 8 of the drawings, Fig. 11 is a perspective view, partially in section, of a mechanism such as may be employed in compressing the metal of the tool during its formation, and, Fig. 12 is a separated perspective view of the die members and supporting plate shown in Fig. 11.

In the embodiment of the invention illustrated in Figs. 1 to 3 of the drawings, I designates a metal bar formed from suitable iron, steel or the like and provided with a recess 2 formed in one end thereof. A plurality of relatively small diamonds 3 are positioned within the recess 2 and substantially uniformly distributed throughout a filling 4, formed of comminuted metal, which may be in the nature of suitable special iron or steel filings or small particles of comminuted hard metal alloy, such as stellite. A metal alloy plug 5 is employed to close the end of the recess 2, the metal of the plug being preferably similar to that from which the bar 1 is formed, and the plug may be shaped to provide a narrow channel communicating with the interior of the recess 2 or may be formed to fit the opening with sufficient freedom to permit the escape, in carrying out the method steps, of such air as may be initially present within the recess.

When the parts have been arranged as shown in Fig. 1, the metal bar 1 or tool assemblage is heated to a high temperature, closely approaching that of the melting points of the metals employed, and under conditions which will substantially prevent oxidation of the metal. In the use of metals such as suitable forms of hard metals, ferrous metal alloys and hard metal alloys, such as stellite, a trade name designating a hard metal alloy which comprises cobalt and one or more metals of the chromium group, the melting points of which range from approximately 2300 to 2700 degrees F. I prefer to heat the bar to a temperature of approximately 1850 to 2100 degrees F. When the bar has been heated as described, it is subjected to a high pressure while in its heated condition, which serves in conjunction with the heat to render portions of the metal including the comminuted metal particles 4, plastic or partially plastic, expelling any air contained in the recess 2, and forcing the slightly plastic metal about the diamond particles 3 to completely embed each diamond within the hard metal so that it is entirely surrounded by and firmly held in the metal of the bar.

The comminuted metal particles 4, whether formed from iron alloy steels or stellite, are caused by the combined heat and pressure to unite intimately with each other and with the metal of the bar 1 and plug 5, in such a manner that the entire metal portion of the bar becomes a compact, substantially homogeneous mass having a plurality of diamonds or diamond particles substantially uniformly arranged therein throughout the area originally defined by the recess 2. The end portion of the bar adjacent to the abrasive area may be cut away, as indicated at 6, to expose the abrasive area for use.

As one means which may be employed for compressing the bar after the same has been heated to the required temperature, I have provided a holder member 10 and die members 11 and 12, as shown in Figs. 11 and 12 of the drawings. The holder member 10 may have a supporting band 14 shrunk thereon in order to furnish additional support for the holder member under the pressures employed. The holder member 10 is provided with an opening 15 located substantially centrally thereof and having the opposite side walls 16 of the opening inclined inwardly from top to bottom. The other opposed side walls 18 of the opening 10 are spaced from each other substantially uniformly throughout their extent. The pair of die members 11 and 12 are of similar construction and are each shaped for insertion within the opening 10. Each of the die members is provided with an outer inclined face 22 and an outer straight face 23, the outer inclined faces 22 being adapted to contact with the inner inclined walls 16 of the opening 10, and the straight faces 23 of the die members engaging those side walls 18 of the opening which are uniformly spaced from each other throughout their extent, when the parts are in assembled position.

Each die member 11 and 12 is provided with an inner longitudinal groove 24, the grooves 24 together forming a contractible chamber or passage 25 located between the die members when they are in assembled position. Each die member 11 and 12 is also provided with transverse slots 26 and 27 communicating with each other and extending transversely of the groove 24 adjacent to the smaller end of each die member. The transverse slots 26 and 27 of the opposite die members are located in a common plane when the die members are in their assembled position and serve to receive and support a plate 28 in such a manner as to permit free movement of the die members towards and from each other within the necessary limits. When the bar 1 or tool assemblage has been heated as previously described it may be subjected to pressure by being placed within the chamber or passage 25 of the die members, when in their position as shown in Fig. 11, so as to be supported by the plate 28. The die members are then forced downwardly within the opening 10 of the holder member, thereby forcing opposite sides of the passage or chamber 25 towards each other to exert a powerful compressive action upon opposite lateral faces of the bar 1. The other opposed faces of the chamber 25 are maintained at a uniform distance from each other by the straight outer faces 23 of the die members engaging the oppositely positioned uniformly spaced inner walls 18 of the holder. It follows that the movement of the die members under the pressure exerted thereon results in the application of high pressure upon opposite lateral faces of the bar 1 while the metal of the bar is held against expansion laterally in directions at right angles to the line of pressure. Such expansion of the metal of the bar as takes place is directed along lines substantially parallel with the major axis of the bar, tending to elongate the bar slightly and at the same time effect an elongation of its molecular structure along lines parallel with the major axis thereof. The amount of applied pressure may vary widely dependent upon the character of the metal employed and the temperature to which the bar is raised prior to the compressing operation, but I have found that in general excellent results are obtained by the use of pressures of from 2,500 to 8,000 pounds per square inch.

In Figs. 4 to 7 of the drawings, I have shown a somewhat modified form and arrangement of means for holding the diamond particles which permits the positioning of the abrasive elements in the form of a thin strip or ribbon within the completed tool body.

In Figs. 4 and 5 there is shown a metal bar or body 30, in the form of a channeled bar, having a base portion 31, sides 32 and ends 33, together with a cover plate 34 adapted to fit substantially within the open face of the channel shaped recess 35. In arranging the parts, I may position a plurality of diamonds or diamond particles 36 within the channel, as shown in Fig. 6, placing the largest side of each particle upon the base of the channel, and when the diamonds or diamond particles are in position, applying a thin and uniform layer of comminuted hard metal 37 thereto so as to substantially cover the diamonds and form a layer 38 of uniform thickness within the channel. The comminuted metal may be iron or steel filings or particles of stellite or other suitable hard metal or alloy, and such comminuted metal is adapted to hold the diamonds or diamond particles in position within the channel until the bar is compressed. When the layer 38 is formed the cover plate 34 is applied and pressed down against the diamond-metal mixture. One or more small openings may be provided about the edge of the cover plate or it may be so shaped as to permit the escape, during the heating and compressing steps, of such small quantities of air as may be present in the channel. The bar 30 is heated to a high temperature, as above described, and subjected to pressure after the manner set forth to effect a complete union of the metal particles, cover plate and bar.

The tool formed as a result of these operations is shown in section in Fig. 7 of the drawings, one end portion being cut away, as indicated at 40, to bring some of the embedded diamonds 36 sufficiently close to the surface to be effective for cutting purposes when the end of the tool is pressed against a wheel to be dressed. The position of the narrow diamond studded ribbon within the tool body is clearly illustrated in the sectional view as shown in Fig. 7.

In Fig. 8 of the drawings there is shown a further modified form of bar or tool shape 42, having a side recess 43 of limited area formed therein for the reception of diamonds or diamond particles 44 to be covered by comminuted metal particles (not shown) substantially after the manner disclosed in Fig. 5 of the drawings. A plug 45 is adapted to close the recess 43 in such a manner as to permit any air present among the metal particles to escape from the recess during the heating and compressing steps without loss or displacement of the diamonds or comminuted metal. After the plug 45 has been inserted in the recess the bar 42 is heated as previously described and subjected to pressure to render the metal and metal portions surrounding the diamonds sufficiently plastic to be forced closely about the diamonds under the pressure employed, as in the forms previously described.

In Fig. 9 of the drawings there is shown a cross-sectional view of the completed tool shape or tool body 42, illustrating the position and arrangement of the diamonds 44 firmly set or embedded within the metal.

In Fig. 10 of the drawings there is shown one form of tool which may be readily constructed by my improved process, as for example, from the form of bar or tool shape shown in Fig. 8. In Fig. 10 the completed tool body 42 has the end portion cut away or rounded as indicated at 47, and a portion of the metal upon one side removed as at 48 to display a substantially plane surface 49 studded with diamond points 44 arranged in a substantially common plane whereby the plurality of diamond points may all be made substantially equally effective for cutting or abrading purposes.

The terms cutting or abrading tool as used herein are intended to apply broadly to diamond drills, dressing tools, and such other special tools employing one or more diamonds or diamond particles for cutting away or abrading refractory substances or materials as may be formed by the method herein described or for which the types of tools herein set forth, or any of them, may be adapted.

While particular emphasis has been placed upon the use of a plurality of diamonds or diamond particles in the formation of dressing tools, as better adapted for the purpose by reason of the plurality of cutting points employed and the fact that by the present method such particles may be so arranged as to form a dressing or cutting tool presenting an abrasive surface of any desired contour for imparting a desired shape and sharp outline to a surface to be abraded, such for example, as grinding wheels of special shape, it will be understood that the invention in its broader aspects comprehends an improved method for setting diamonds of any desired size in a hard metal base in such a manner as to firmly embed the diamond in the hard metal and permit its use for any desired cutting or abrading operation for which it may be adapted.

In the formation of dressing tools generally, I prefer to employ diamonds ranging in size from fifty to the carat to fine diamond particles such as are designated by the term "diamond grit" for the reasons above stated of providing an abrasive surface or path containing a great number of cutting points arranged in such a manner as to be simultaneously effective over a surface of predetermined contour or within a path of the desired shape and trend. It will be readily apparent that while I have shown in Fig. 10 of the drawings an abrading surface of uniformly level contour, and in Fig. 7 of the drawings, the abrasive particles arranged in a straight ribbon-like path, my method may be employed for forming abrading surfaces of various contours and shapes as well as the arrangement of the particles within a variety of paths located within the metal of the tool. Such arrangements of the particles adapt the tools for use in dressing abrasive surfaces of special shape which it is desired to preserve sharply defined. The fineness of the particles employed may be limited only by the consideration that the particles should be sufficiently large not to agglomerate, that is, of such size that each particle may be separately embedded in the metal and firmly held thereby.

In addition to the above the improved method may be employed in making cutting or abrading tools by setting or embedding in hard metal various other forms of hard abrasive or cutting materials which possess such resistance to heat as not to be injured or destroyed by the temperatures employed in forming the tools, such for example, as carborundum or tungsten carbide particles or fragments.

The term "hard metal" as employed in the specification and claims is intended to designate such forms of iron, steel, alloy steels and special hard metal alloys as may be adapted for the purpose, as contradistinguished from the soft metals, such as copper, amalgams and the like, such as have been used heretofore in setting diamonds in cutting tools. I have found that iron, machine steel, high speed steels and stellite are well adapted for the purpose. The hard metals employed when forced about the diamonds, while at a high temperature and under pressure, tend to hold firmly the diamonds in position at all times until they are almost entirely worn away, even when the cutting tool becomes heated from use, while the softer metals either lack firmness in holding the diamonds or tend to permit the diamonds to work loose at high temperatures.

While I have described the manner of embedding the diamond or diamonds in hard metal as being accomplished by surrounding the abrasive elements with comminuted metal particles, it will be possible to set single large stones in this manner by forming an opening of suitable size in the tool body so that the stone may be closely fitted therein and then inserting a plug having one end shaped to fit substantially the surface of the stone, and then heating and compressing the metal as above described. It is not my purpose therefore to limit the claims to the use of comminuted metal particles for this purpose except as may be specifically set forth therein.

It will be seen that the present method of making a tool of this character renders it possible to so position the diamonds in the tool body as to provide an abrasive area which may assume any one of a variety of different forms. As shown in Figs. 1 to 3, the abrasive area may be in the form of rod of suitable cross-section, or the cutting area may be in the form of a ribbon extending through the tool body in any desired direction as shown in Figs. 4 to 7 inclusive. The cutting or abrasive area may also be so shaped and positioned in the tool body as to permit the removal of the metal to expose the abrasive area in the form of a surface of any desired shape, as indicated in Fig. 10.

It is to be understood that the degree of heat required in heating the metal body prior to the application of pressure thereto and the amount of pressure to be applied may vary with the size of the metal body as well as with the material from which it is formed, that is, its hardness and melting point. The invention therefore is not to be limited to any specific temperature range for heating the metal body prior to the application of pressure nor to any exact pressure, it being necessary only to select temperatures and pressures so co-related as to render the metal surrounding the diamonds substantially plastic under the pressure employed, so that the surrounding metal may be caused to flow closely about the diamonds or diamond particles without crushing the stones or overheating them.

What I claim is:—

1. The method of making a diamond cutting tool which comprises, forming a recess in a tool body, positioning two or more diamonds in said recess in a certain definite relationship with each other and with the tool body while surrounding the diamonds on all sides with a comminuted metal alloy comprising cobalt and one or more metals of the chromium group, providing a metal closure for the recess, heating the tool body to a temperature approaching the fusion point of the comminuted metal and immediately subjecting the tool body to a pressure sufficient to completely unite the metals and effect a substantial compression of the same.

2. The method of setting an abrasive cutting element in a metal body which comprises, forming a recess in one face of a metal body, positioning an abrasive cutting element within the recess while surrounding the same with a hard metal alloy comprising cobalt and one or more metals of the chromium group, providing a metal closure for the recess, heating the composite metal body to a temperature closely approaching the melting point of the hard metal alloy under non-oxidizing conditions and immediately subjecting the same to high pressure throughout its extent to completely unite and compress the several metals about the cutting element.

3. The method of making a cutting tool which comprises, completely enclosing a cutting element within a hard metal body while entirely surrounding said cutting element within the body with a metal alloy which comprises cobalt and one or more metals of the chromium group to form a tool assemblage, raising the tool assemblage thus formed to a temperature closely approaching the melting point of the alloy metal under non-oxidizing conditions and immediately subjecting the same to a high pressure sufficient when taken in connection with the heat previously applied to partially plasticize the alloy metal and effect a complete union of the dissimilar metals.

4. The method of making a cutting tool which comprises, embedding an abrasive cutting element in powdered stellite, enclosing the cutting element containing mass within a metal casing to form a tool assemblage, heating the tool assemblage to a temperature closely approaching the melting point of the stellite under non-oxidizing conditions and subjecting the assemblage while at a temperature closely approaching the melting point of the stellite to a pressure sufficient when taken in conjunction with the heat previously applied to partially plasticize the stellite and effect a complete union of the stellite and the enclosing metal, and then removing a part of the surrounding metal to expose a portion of the cutting element.

5. The method of setting a diamond in stellite which comprises, positioning a diamond within a recess formed in a metal holder and entirely surrounding the diamond within the holder with comminuted stellite to fill completely the interior of the recess, closing the recess by means of a metal closure member, heating the metal holder assemblage thus formed to a temperature approximating the melting point of the stellite under non-oxidizing conditions and subjecting the assemblage while at a temperature closely approximating the melting point of the stellite to a pressure sufficient when taken in conjunction with the heat already present in the metal to partially plasticize the stellite and effect a complete union of the metals while embedding the diamond in a stellite core located within the metal holder.

6. The method of making an abrasive cutting tool which comprises, placing an abrasive cutting element within a core of comminuted hard metal alloy comprising cobalt and one or more metals of the chromium group, completely surrounding the hard metal alloy core with a hard metal casing, and then effecting solidification of the comminuted hard metal alloy and intimately uniting the same with said casing throughout its extent, by heating the composite shape to a temperature closely approaching the melting point of the metal alloy and subjecting the same to a pressure sufficient when taken in conjunction with the heat present in the metal to plasticize the metal alloy sufficiently to cause it to flow about the abrasive cutting element and make an intimate union with the surrounding hard metal casing.

FERNANDO OSCAR JAQUES.